US009481451B2

United States Patent
Rawlings et al.

(10) Patent No.: US 9,481,451 B2
(45) Date of Patent: Nov. 1, 2016

(54) RIGID TIPPED RIBLETS

(71) Applicant: The Boeing Company, Chicago, IL (US)

(72) Inventors: Diane C. Rawlings, Bellevue, WA (US); Kevin R. Malone, Renton, WA (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 14/051,271

(22) Filed: Oct. 10, 2013

(65) Prior Publication Data

US 2014/0248469 A1 Sep. 4, 2014

Related U.S. Application Data

(63) Continuation of application No. 12/361,840, filed on Jan. 29, 2009, now Pat. No. 8,684,310.

(51) Int. Cl.

| | |
|---|---|
| *B64C 21/10* | (2006.01) |
| *B32B 3/30* | (2006.01) |
| *B32B 15/08* | (2006.01) |
| *B32B 25/08* | (2006.01) |
| *F15D 1/00* | (2006.01) |
| *B64C 1/38* | (2006.01) |
| *B32B 27/28* | (2006.01) |
| *B32B 27/34* | (2006.01) |
| *B32B 27/38* | (2006.01) |
| *B32B 27/40* | (2006.01) |

(52) U.S. Cl.
CPC ............. *B64C 21/10* (2013.01); *B32B 3/30* (2013.01); *B32B 15/08* (2013.01); *B32B 25/08* (2013.01); *B32B 27/283* (2013.01); *B32B 27/288* (2013.01); *B32B 27/34* (2013.01); *B32B 27/38* (2013.01); *B32B 27/40* (2013.01); *B64C 1/38* (2013.01); *F15D 1/004* (2013.01); *F15D 1/0035* (2013.01); *B32B 2250/02* (2013.01); *B32B 2307/416* (2013.01); *B32B 2307/50* (2013.01); *B32B 2307/702* (2013.01); *B32B 2605/18* (2013.01); *B64C 2230/26* (2013.01); *Y02T 50/166* (2013.01); *Y10T 428/24612* (2015.01)

(58) Field of Classification Search
CPC ..... B64C 21/10; B64C 1/38; B64C 2230/26; F15D 1/0035; F15D 1/004; B32B 3/30; B32B 25/08; B32B 15/08; B32B 2307/702; B32B 2605/18; B32B 2307/50; B32B 2250/02; Y02T 50/166; Y10T 428/24612
See application file for complete search history.

(56) References Cited

U.S. PATENT DOCUMENTS

| | | | |
|---|---|---|---|
| 2004/0126541 A1* | 7/2004 | Dietz et al. ................... | 428/167 |
| 2007/0060026 A1* | 3/2007 | Sung ............................... | 451/56 |
| 2010/0080958 A1* | 4/2010 | Goelling ....................... | 428/172 |
| 2010/0108813 A1* | 5/2010 | Lang ............................. | 244/130 |

OTHER PUBLICATIONS

Engage. Merriam-Webster.com. Retrieved Dec. 18, 2015 from http://www.merriam-webster.com/dictionary/engage.*

* cited by examiner

*Primary Examiner* — Laura Auer
(74) *Attorney, Agent, or Firm* — Felix L. Fisher

(57) ABSTRACT

A multilayer construction for aerodynamic riblets includes a first layer composed of a material with protuberances, the first layer material exhibiting a first characteristic having long-term durability and a second layer composed of a material, exhibiting a second characteristic with capability for adherence to a surface.

8 Claims, 10 Drawing Sheets

RIGID TIPPED RIBLETS

REFERENCE TO RELATED APPLICATIONS

This application is a continuation of U.S. patent application Ser. No. 12/361,840 entitled Rigid Tipped Riblets and having a common assignee with the present application, the disclosure of which is incorporated herein by reference. This application is also copending with U.S. patent application Ser. No. 12/361,882 filed on Jan. 29, 2009 entitled Shaped Memory Riblets and U.S. patent application Ser. No. 12/361,918 filed on Jan. 29, 2009 entitled Amorphous Metal Riblets, both having a common assignee with the present application, the disclosures of which are incorporated herein by reference.

BACKGROUND INFORMATION

1. Field

Embodiments of the disclosure relate generally to the field of surface geometries for aerodynamic improvements to aircraft or surfaces having a flow interface and more particularly to embodiments and fabrication methods for rigid riblets having improved damage resistance.

2. Background

Increasing fuel efficiency in modern aircraft is being accomplished through improvement in aerodynamic performance and reduction of structural weight. Recent advances in the use of microstructures such as riblets on aerodynamic surfaces have shown significant promise in reducing drag to assist in reducing fuel usage. Riblets have various forms but advantageous embodiments may be ridge-like structures that minimize drag on the surface of an aircraft. Riblets may be used in areas of a surface of an aircraft where turbulent regions may be present. Riblets may limit circulation causing a breakup of large scale vortices in these turbulent regions near the surface in the boundary layer to reduce drag.

In certain tested applications, riblets have been pyramidal or inverted V shaped ridges spaced on the aerodynamic surface to extend along the surface in the direction of fluid flow. Riblet structures have typically employed polymeric materials, typically thermoplastics. However in service use such as on an aircraft aerodynamic surface, polymers are relatively soft and thus reducing the durability of the surface. Existing solutions with polymeric tips may readily deform hundreds of percent with fingernail pressure and may be unrecoverable. Such structures may be undesirable in normal service use on an aircraft or other vehicle. Additionally aircraft surfaces are typically required to withstand interactions with various chemicals including Skydrol®, a hydraulic fluid produced by Solutia, Inc. In certain applications elastomers that resist or recover from severe deformation created at the tip may be employed to form the riblets. However, many elastomers and other polymers may not be compatible with Skydrol® or other aircraft fluids or solvents.

The practicality of riblets for commercial aircraft use would therefore be significantly enhanced with a riblet structure providing increased durability and aircraft fluids compatibility.

SUMMARY

Exemplary embodiments provide a multilayer construction having a first layer composed of a material with riblets, the first layer material exhibiting a first characteristic of having long term durability and a second layer composed of a material exhibiting a second characteristic with capability for adherence to a surface. The multilayer construction is employed in exemplary embodiments wherein the riblets are implemented on a vehicle, the riblets having long-term durability due to the rigidity of the first layer.

In various embodiments, the multilayer construction for an array of aerodynamic riblets is created by a plurality of rigid tips with a layer supporting the rigid tips in predetermined spaced relation and adhering the rigid tips to a vehicle surface. In exemplary embodiments, the rigid tips are formed from material selected from the set of nickel, chromium, metal alloy, glass, ceramic, silicon carbide and silicon nitride. Additionally, the supporting layer may be continuously cast with the tips as a surface layer. Alternatively, a polymer support layer is deposited on the surface layer opposite the tips. An adhesive layer deposited on the polymer support layer forms a multilayer appliqué, and provides the capability for adhering the appliqué to the vehicle surface.

In another exemplary embodiment, the supporting layer is an elastomeric layer engaging the tips and a metal foil and a polymer layer are provided intermediate the elastomeric layer and the adhesive layer. The metal foil, polymer layer and adhesive layer may be provided as a preformed appliqué. For exemplary embodiments using the elastomeric layer, the tips each incorporate a base and each base may be embedded in the elastomeric layer.

For greater flexibility in certain applications, each tip is longitudinally segmented.

An aircraft structure may be created by an array of aerodynamic riblets having a plurality of rigid tips formed from material selected from the set of nickel, chromium, metal alloy, glass, ceramic, silicon carbide and silicon nitride and segmented longitudinally at predetermined locations. An elastomeric layer engages bases extending from the rigid tips and a polymer support layer is deposited on the elastomeric layer opposite the tips. An adhesive layer deposited on the polymer support layer to forms a multilayer appliqué. The adhesive layer adheres to a surface of the aircraft.

The embodiments disclosed are fabricated in an exemplary method by forming a master tool having protuberances corresponding to a desired riblet array and forming a complementary tool from the master tool. A plurality of rigid tips is then cast in the master tool using electroforming, casting or other desirable deposition technique. The cast rigid tips are then removed from the complementary tool and adhered to an aerodynamic surface.

In exemplary aspects of the method, resist is applied to the complementary tool for a segregating the rigid tips and removed subsequent to casting the rigid tips. An elastomeric layer is then cast engaging the rigid tips and a multilayer appliqué is applied to the elastomeric layer to form a riblet array appliqué.

In exemplary embodiments of the method, the multilayer appliqué comprises a metal foil, a polymer support layer and an adhesive layer. An adhesive liner covering the adhesive layer and masking covering the riblets may be employed for handling. The riblet array may then be adhered to the aerodynamic service by removing the adhesive liner and applying the riblet array appliqué to the aerodynamic surface and removing the masking.

In an alternative method, casting the plurality of rigid tips includes casting of the plurality of tips and an intermediate surface layer as a cladding. An elastomeric layer is then cast to the cladding.

A method for fabricating an array of aerodynamic riblets for an aircraft surface may be accomplished by diamond machining a form and curing an acrylate film on the form. The acrylate film is then stripped from the form and applied to a roller to form a master tool having protuberances corresponding to a desired riblet array. A silicon complementary web tool is created by impression on the master tool. A metal coating is then sputtered on the complimentary web tool and a plurality of rigid tips is then electroformed in the complimentary web tool. A multilayer appliqué having a metal foil, a polymer support layer and an adhesive layer to the elastomeric layer is applied to form a riblet array appliqué. The rigid tips are then adhered to an aerodynamic surface using the adhesive layer of the applique and the silicone complementary web tool is then stripped from the rigid tips.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

Figure 1:
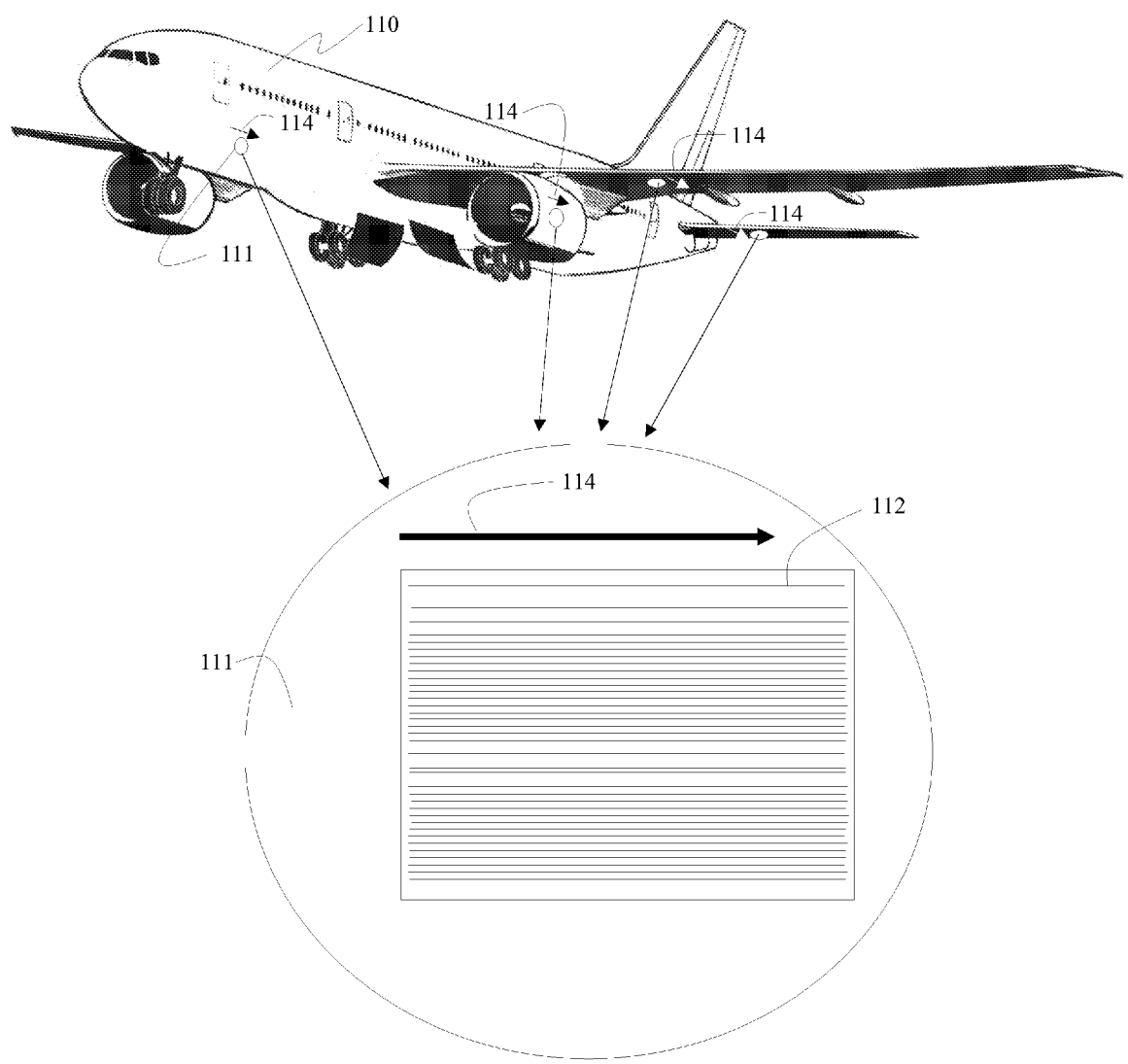
FIG. 1 is an isometric view of a portion of an aerodynamic surface such as a wing or fuselage skin showing exemplary riblets extending in the flow direction.
Figure 2A:
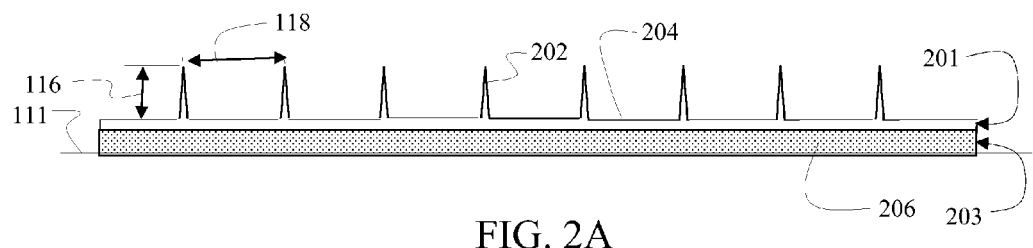
FIG. 2A is a lateral section view perpendicular to the flow direction of a first embodiment for rigid tipped riblets.
Figure 2B:
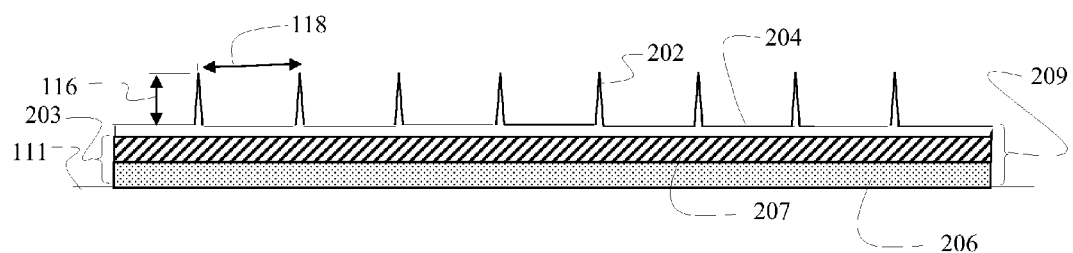
FIG. 2B is a lateral section view of a modification of the embodiment of FIG. 2A with an additional support layer.

An exemplary embodiment of rigid tipped riblets having a structure as will be described in greater detail subsequently is shown as a portion of an aerodynamic surface for an aircraft is shown in FIG. 1. "Rigid" as used herein generally refers to a high modulus of elasticity and/or a high load to failure. Many of these materials may have a small strain elastic region. Exemplary embodiments herein employ rigid materials which may have moduli of elasticity up to and larger than about $25 \times 10^6$ lbs/in$^2$ with deformation response essentially all elastic. The aircraft 110 employs a structure with a surface 111, shown enlarged, having multiple substantially parallel riblets 112 arranged parallel to the flow direction as represented by arrow 114. For the exemplary embodiment shown, the dimension 116 perpendicular to the surface 111 (as shown in FIGS. 2A and 2B for example) is approximately 0.002 inch while the tip-to-tip spacing 118 between the riblets is approximately 0.003 inch. Spacing may vary depending on the fluid dynamic properties of the air, water or other fluid for which the application of riblets is employed. The aerodynamic surface is typically curved and may be, without limitation, a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains moving in a gaseous fluid, commonly air, or on boats, submarines, hydrofoils, fluid flow conduits or other surfaces exposed to liquid fluid flow.

The embodiments disclosed herein recognize and provide the capability for riblets that may resist various impacts and/or other forces that may reduce riblet durability. Further, certain of the different advantageous embodiments provide a multi-layer structure that may have a support layer and a plurality of riblet tips located on or extending from the support layer. The tips which form the riblets may be fabricated from stiff metals such as nickel (used for the embodiments described herein) or alternative rigid materials such as chromium, other metal alloys, glass, ceramics, Silicon Carbide or Silicon Nitride. The materials of the multilayer structure are flexible and may be formed as an appliqué separately or in combination with the riblets for fastening, bonding, coupling or otherwise attaching to a surface to improve aerodynamics of a vehicle such as an aircraft.

A first embodiment for rigid tipped riblets is shown in FIG. 2A as a multilayer construction. Individual tips 202 of the riblets protrude from a surface layer 204 to provide a first layer 201 of the multilayer construction. The protruding riblets and continuous surface layer are formed by casting or deposition, as will be described in greater detail subsequently, of the rigid material desired for providing a first characteristic of durability. In an exemplary embodiment, nickel is employed. For the embodiment shown in FIG. 2A a second layer 203 created by an adhesive layer 206 is deposited on a bottom 204a of the surface layer 204. Exemplary adhesives for use in various embodiment may include, without limitation, acrylic pressure sensitive adhesive, sylilated polyurethane pressure sensitive adhesive; thermoplastic adhesive; heat-reactive adhesive or epoxy adhesive. In alternative embodiments, a supporting polymer layer 207 engages the surface layer 204 intermediate the surface layer and adhesive layer as shown in FIG. 2B as a portion of the second layer. The polymer layer 207 may be, without limitation, a polymer film or other suitable material. In certain embodiments polyetheretherketone (PEEK) is employed as the film. Additionally, a foil or metallic layer 310 as will be described with respect to the embodiment of FIG. 3 may be employed for lightning strike protection, particularly where the riblet tips 202 and surface layer 204 are non-metallic. The polymer, adhesive and/or other elements in the second layer provide a second characteristic of resilience and the ability to adhere to the surface.

Figure 2C:
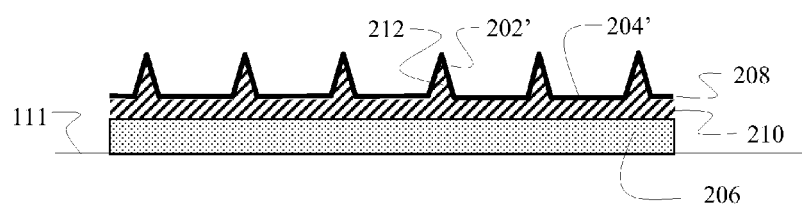
FIG. 2C is a lateral section view of a modification of the embodiment of FIG. 2A with rigid cladding over an elastomer core.

FIG. 2C is an additional alternative embodiment wherein the nickel or alternative rigid material is employed as a contoured surface cladding 208 forming the tips 202' and surface layer 204' as the first layer of the multilayer construction. As the second layer, a polymer layer 210 is employed. The polymer layer 210 in certain embodiments as described herein may be an elastomer and may be cast into the cladding 208 or conversely the cladding 208 cast over the polymer layer 210. The polymer layer 210 provides both a support layer 206' and light weight cores 212 for the tips 202' to maintain the predetermined spaced relation of the tips 202'. Exemplary elastomers used in exemplary embodiments may be polyurethane elastomers, polysulfide elastomers, epoxy-based elastomers, silicones, fluoroelastomers, fluorosilicone elastomers, EPDM elastomers, or other polymers with lower strain to yield, for example thermoplastic polyurethanes, PEEK, PEKK or polyamide. This alternative embodiment may allow weight reduction and flexibility of the structure may be further enhanced. The polymer layer 210 may then be adhered to a surface using an adhesive layer 206 or directly as described with respect to FIG. 2D.

In the form shown in FIG. 2A, 2B or 2C, the embodiment may fabricated as a multilayer appliqué 209, as shown in FIG. 2B, including the tips 202, surface layer 204, polymer layer 207 and adhesive layer 206 which can then be adhered to the aerodynamic surface 111 using the adhesive layer 206.

Figure 2D:
FIG. 2D is a lateral section view of a modification of the embodiment of FIG. 2A without an adhesive layer for direct thermoplastic boding.

In alternative embodiments, the surface layer 204 may be directly adhered to or deposited on an aircraft surface 111. FIG. 2D demonstrates an embodiment similar to that described with respect to FIG. 2C however, no adhesive layer is employed. Elastomeric layer 210' is a thermoplastic cast into the nickel cladding 208 which allows direct bonding to the aircraft surface 111 with application of heat.

Figure 3:
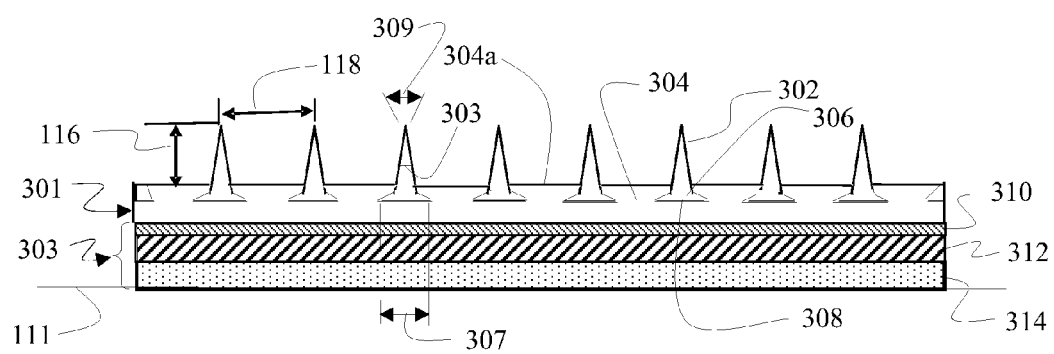
FIG. 3 is a lateral section view of a second embodiment for rigid tipped riblets with lateral structural separation of the riblets.

Another embodiment for rigid tipped riblets is shown in FIG. 3. With complex or multiple curved surfaces, it may be desirable in the first layer 301 for the individual riblet tips 302 to be separated from each other perpendicular to the flow direction for greater lateral flexibility. For the embodiment shown individual tips 302 protrude from an elastomeric layer 304. Tips 302 have an internal angle 303 of approximately 30° for the exemplary embodiment. A base 306 expands from each tip. In certain embodiments the elastomeric layer 304 surrounds the base 306 to provide greater structural continuity. In alternative embodiments a bottom face 308 of the base adheres directly to the exposed surface 304a of the elastomeric layer 304.

The second layer 303 is created by a multilayer structure incorporating a screen and/or foil metallic layer 310 such as aluminum, a polymer layer 312 such as PEEK and an adhesive layer 314 supports the elastomeric layer 304. The polymer layer 312 and adhesive layer 314 may be supplied as a portion of the preformed appliqué as described with respect to FIG. 9 below or directly deposited on the elastomeric layer 304. The metallic layer 310 provides a conducting material for lightning strike protection in an exemplary aircraft usage of the embodiment. The metallic layer, polymer and adhesive multilayer structure may be comparable to a current lightning strike appliqué (LSA) employed for composite aircraft structural surfaces.

The elastomer layer 304 supporting the riblet tips 302 may provide elastic sideways deformation and recovery for the tips 302 when lateral forces are applied thereby further enhancing the durability of the rigid riblet tips. Additionally, the elastomeric layer 304 flexibility may allow greater ability to conform to complex contour shapes.

Figure 4:
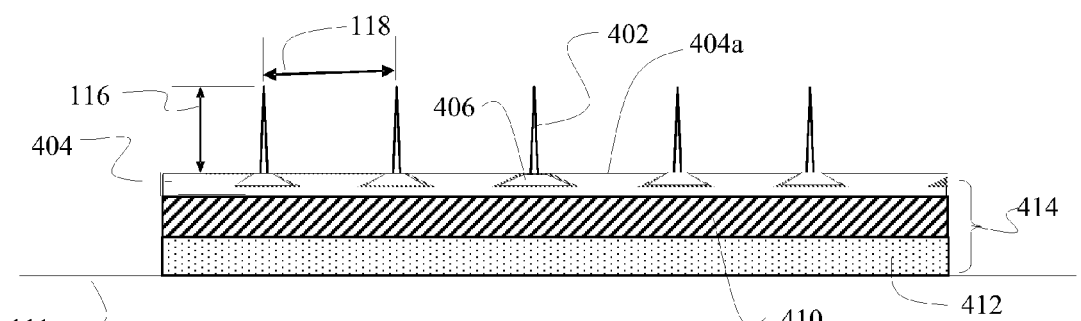
FIG. 4 is a lateral section view of a third embodiment for rigid tipped riblets with reduced cross-section and with lateral separation.

FIG. 4 demonstrates a third embodiment for the rigid tipped riblets 112 in FIG. 1 which takes advantage of the structural capability provided by the material from which the riblets 112 are formed to allow a sharper profile of tips 402. For the embodiment shown in each of the tips 402 extends from a base 406 supported in an elastomer layer 404. As with the embodiment described with respect to FIG. 3 the base 406 of each tip 402 is surrounded by the elastomer to structurally retain the base 406 within the elastomer layer 404. In alternative embodiments, the extended bottom surface 408 of the base 406 may be adhered to the surface 404a of the elastomer layer 404. The embodiment of FIG. 4 also employs riblet tips 402 separated perpendicular to the flow direction 114 as in the embodiment of FIG. 3. However, in alternative embodiments a continuous surface layer 204 from which the tips 202 extend as disclosed for the embodiment described with respect to FIG. 2A may be employed.

As also disclosed in FIG. 4 the embodiment employs a supporting polymer layer 410 on which the elastomer layer 404 is adhered or deposited. An adhesive layer 412 extends from the polymer layer opposite the elastomer layer 410 forming a multilayer appliqué 414.

Figure 5A:
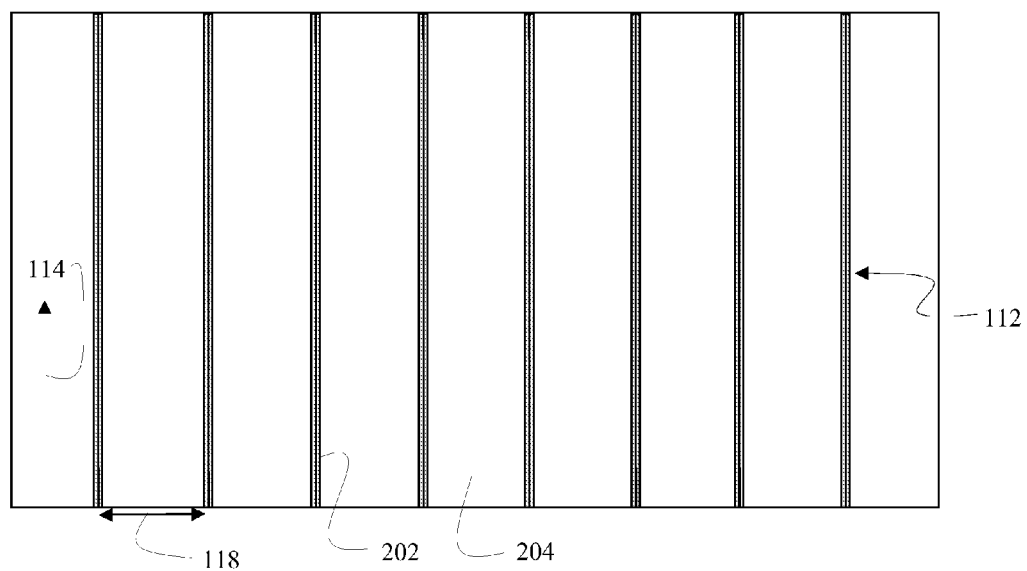
FIG. 5A is a top view of a portion of an aerodynamic surface employing riblets of the first embodiment as shown in FIG. 2B.
Figure 5B:
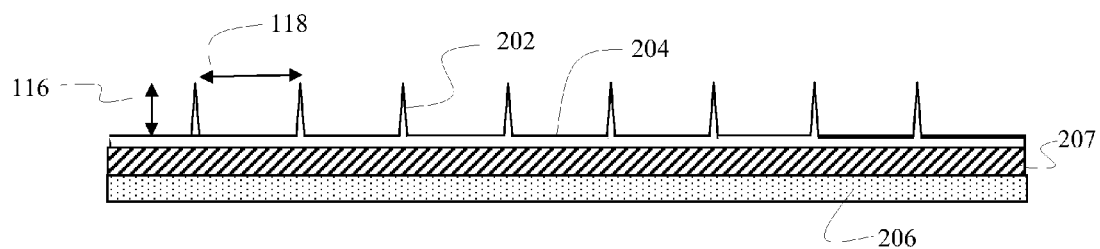
FIG. 5B is a section view comparable to FIG. 2B for reference with the features of FIG. 5A.
Figure 6A:
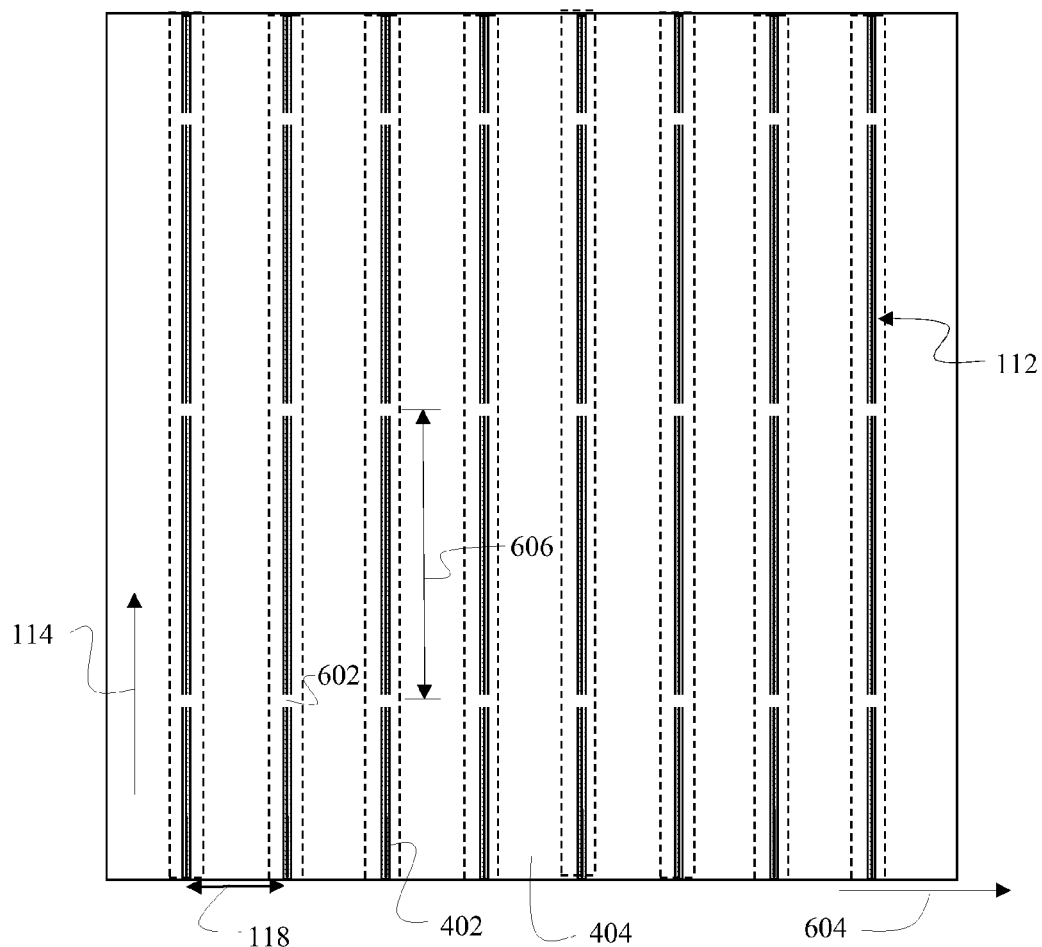
FIG. 6A is a top view of a portion of an aerodynamic surface employing riblets of the second embodiment shown in FIG. 2B with additional longitudinal separation of riblet sections.
Figure 6B:
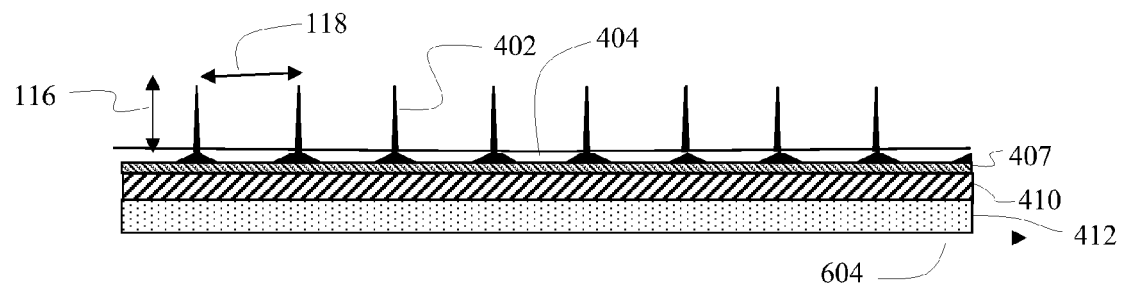
FIG. 6B is a section view comparable to FIG. 4 for reference with the features of FIG. 6A.

FIG. 5 shows a top view of the embodiment as disclosed in FIG. 2B. The riblets formed by the tips 202 extend longitudinally along surface layer 204 in the flow direction 114. The thin surface layer 204 provides for flexibility in adhering to curvature having tangents substantially perpendicular to the riblets. However as previously described, the surface 111 on which the riblets 112 may be employed may have multiple complex curvatures requiring greater flexibility. The embodiments previously described may therefore be adapted as shown in FIG. 6A wherein the individual tips 402 as described with respect to FIG. 4 are laterally separated by spacing 118 substantially perpendicular to the flow direction 114 with bases 406 attached to or captured within an elastomer layer 404. This provides even greater flexibility for adhering to surfaces with curvatures having tangents (generally shown as represented by arrow 604) substantially perpendicular to the riblets 112. The scale of the drawings herein based on the small riblet dimensions makes the surfaces appear flat even though they may be curved in larger scale. An aluminum foil layer 407 has been added to the embodiment of FIG. 6B for demonstration of an embodiment for lightning strike protection with tips 402 which may be non-metallic. Additionally the individual riblets incorporate longitudinal separation in the flow direction using gaps 602 to segment the riblet to provide greater flexibility for adhering to surfaces having curvatures with tangents substantially parallel to the riblets 112 in the flow direction 114. For the embodiment shown gaps 602 may be evenly spaced in the riblets 112 at substantially equal longitudinal distances 606. In alternative embodiments spacing on individual riblets 112 and between riblets 112 may be uneven and chosen in a predetermined manner to accommodate surface curvature as required.

Figure 7A:
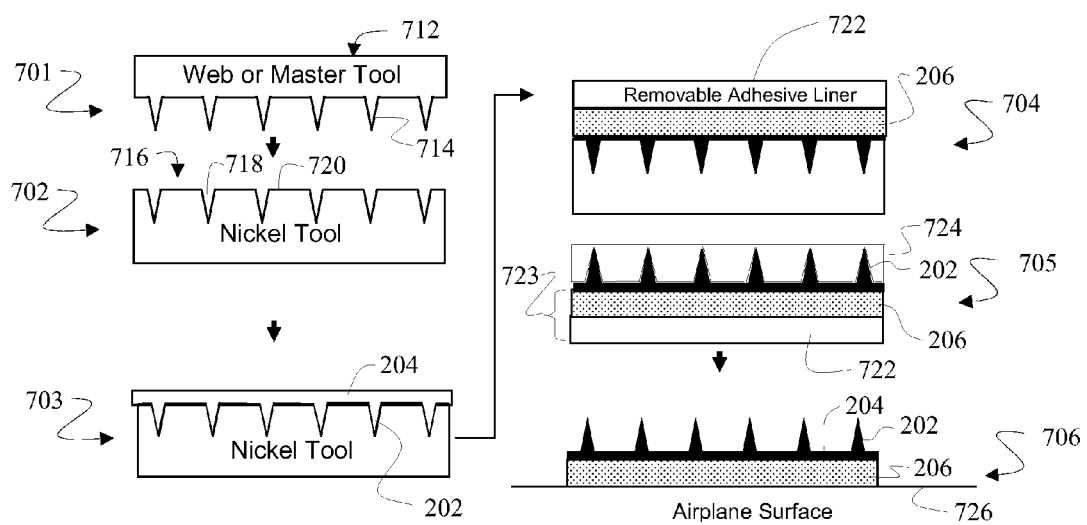
FIG. 7A is a flow diagram of processing steps for a first exemplary method of fabrication of rigid tipped riblets of the first embodiment.
Figure 7B:
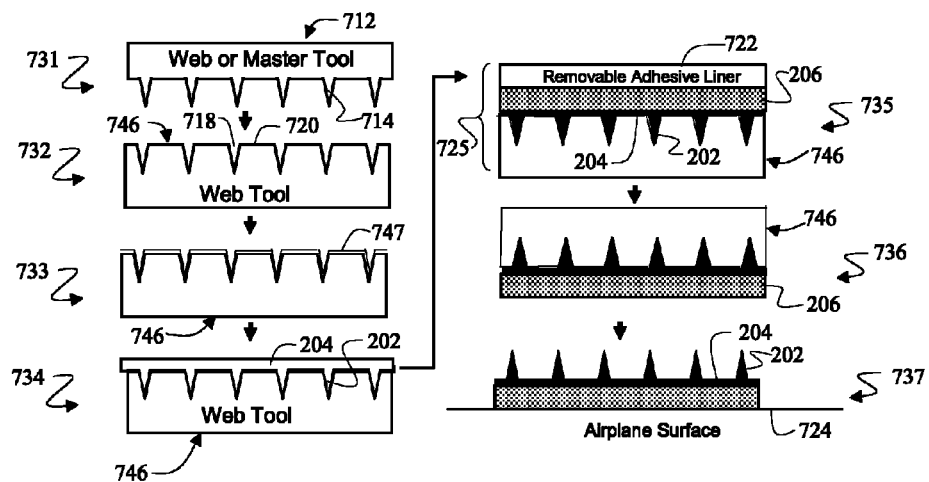
FIG. 7B is a flow diagram of processing steps for a second exemplary method of fabrication of rigid tipped riblets of the first embodiment.
Figure 7C:
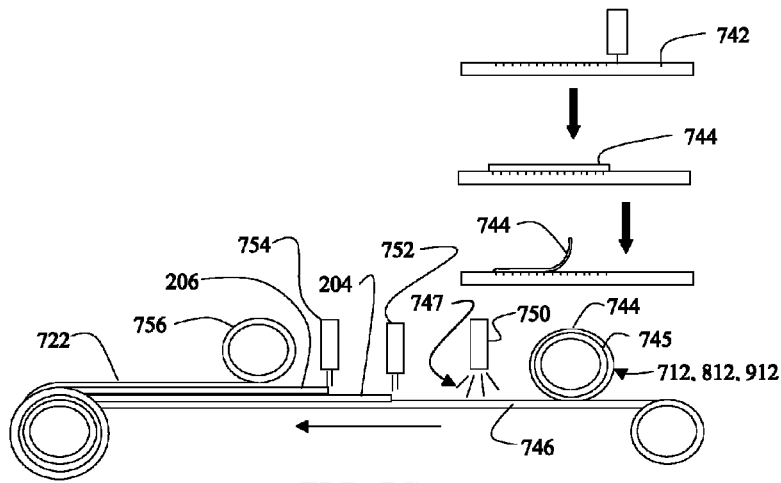
FIG. 7C is a flow diagram of roll-to-roll processing for the method shown in FIG. 7B

FIG. 7A is a flow diagram showing a first exemplary manufacturing process for a riblet structure as defined in the embodiment described with respect to FIG. 2A. In step 701 a master tool 712 is created using, as an example without limitation, diamond machining of a copper form or other suitable material on which an acrylate film is cured then stripped to define spaced protuberances 714 corresponding to the desired riblet dimensions. The tool 712 as shown in FIG. 7A may be a section of a flat tool, or a roller employed for roll-to-roll web processing. Exemplary details of a web processing format are shown in FIG. 7C. For the embodiment shown in FIG. 7A nickel is employed for the rigid tips 202. A complimentary tool 716 is created in step 702 by impression, casting or electroforming on the master tool 712 which provides grooves 718 corresponding to the riblet shape. Spacing between the grooves 718 provides a substantially flat intermediate surface 720 corresponding to the dimension 118 desired between the tips 202. In step 703, rigid tips 202 and surface layer 204 may be deposited by electro-forming onto the complimentary tool 716. In certain embodiments, a release compound is applied to the surfaces on the complimentary tool to assist in removal of the cast riblets and surface layer from the tool. Adhesive layer 206 is then applied, in step 704, to the surface layer 204 opposite the rigid tips 202. The adhesive layer 206 may be combined with a polymer layer, such as support layer 207 as shown in FIG. 2B and supplied as a preformed appliqué which is then joined with the electroformed surface layer 204. A removable adhesive liner 722 for handling of the completed appliqué is added as also shown in step 704. The appliqué, created by surface layer 204 and adhesive layer 206, is removed from the complimentary tool 716 and a masking layer 724 is applied for handling as shown in step 705. For exemplary embodiments, the masking employed may be, without limitation, static masking films, masking films with low tack pressure sensitive adhesive, or castable films of silicone. Application to the aircraft surface 726 is accomplished as shown in step 706 by removal of the adhesive liner 722 followed by attachment of the adhesive layer 206 of the appliqué to aircraft surface 726. Removal of the masking layer 724 completes the riblet appliqué processing.

The complimentary tool 716 may be a "web tool" which may be silicone or polymeric film. Roll-to-roll processing for the steps described subsequently may then be employed as shown in FIG. 7C and the web tool 716 may be left in place as the masking that is removed after installation of the array of riblets 112 on the aircraft surface 726. As shown in FIG. 7B for a method employing the web tool approach, a master tool 712 is created in step 731 define spaced protuberances 714 corresponding to the desired riblet dimensions. The tool 712 as shown in FIG. 7B may be a section of a flat tool, or a roller employed for roll-to-roll web processing. A complimentary web tool 746 is created in step 732 by roll processing silicone on the master tool 712 which provides grooves 718 corresponding to the riblet shape. Spacing between the grooves provides a flat intermediate surface 720 corresponding to the dimension 118 desired between the rigid tips 202. A conductive layer, shown as the dashed line designated as element 747, is then sputtered onto the silicon web tool, in step 733, providing a conductive surface on the web tool. In step 734, rigid tips 202 and surface layer 204 are deposited by electro-forming onto the web tool. Adhesive layer 206 is then applied in step 735 to the surface layer 204 opposite the rigid tips 202. The adhesive layer 206 may be combined with a polymer layer 207, as shown for the embodiment in FIG. 2B, and supplied as a preformed appliqué 723 which is then joined with the electroformed surface layer 204. A removable adhesive liner 722 for handling of the completed appliqué 723 is added as also shown in step 735. Application to the aircraft surface 724 is accomplished by removal of the adhesive liner 722 shown in step 736 followed by attachment of the adhesive layer 206 of the appliqué to aircraft surface 724 in step 737. Stripping of the silicone web tool 746 exposes the rigid tips 202 of the riblets and completes the riblet appliqué processing.

As shown if FIG. 7C, a roll-to-roll web processing approach may be employed for the methods described. Master tool 712 is created using, as an example, diamond machining of a copper form 742 on which an acrylate film 744 is cured then stripped and applied to a roller 745 to provide the master tool 712 shown in the drawing. Complimentary web tool 746 is then created by impression on master tool 712. Conductive layer 747 is sputtered onto the web tool 746 using sputtering gun 750 and electroforming of the tips 202 surface layer 204, as shown for example in FIG. 7B, onto the web tool 746 is accomplished with deposition tool 752. The adhesive layer 206 is then deposited on the surface layer 204 with deposition tool 754 and the removable adhesive liner 722 attached by application from roll 756. The multilayer appliqué 725 is then available for attachment to the aircraft surface 724 as shown, for example, in step 737 of FIG. 7B.

Figure 8:
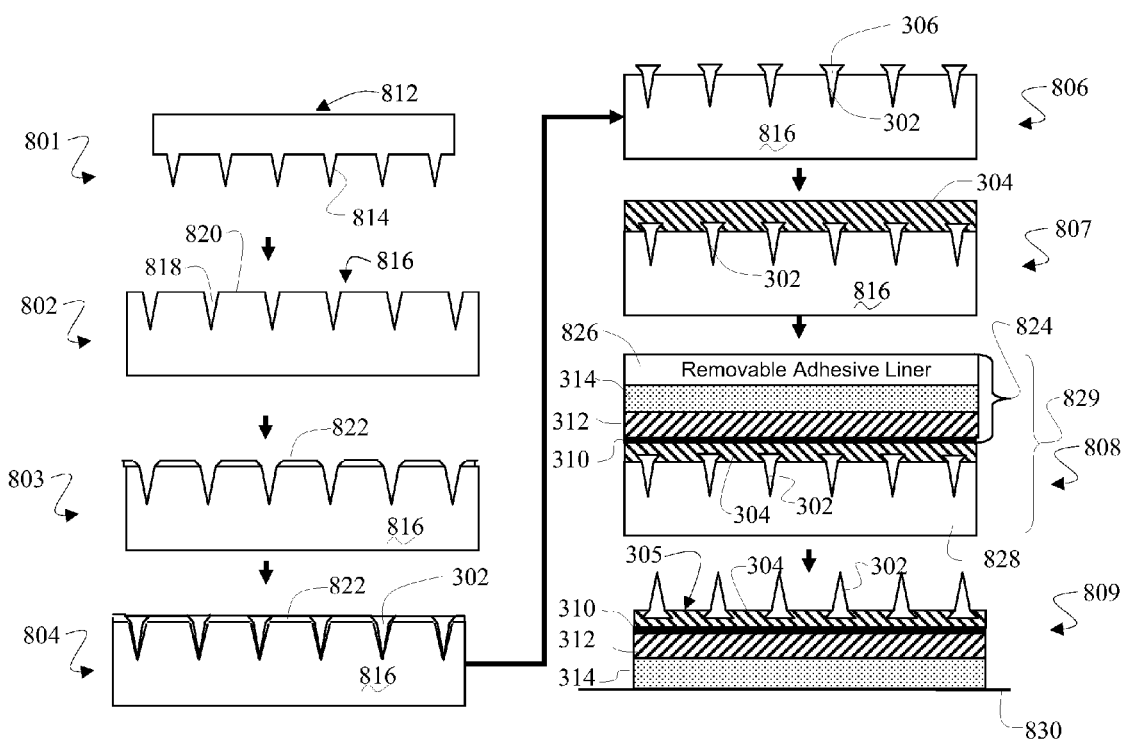
FIG. 8 is a flow diagram of processing steps for an exemplary method of fabrication of rigid tipped riblets of the second embodiment.

FIG. 8 is a flow diagram showing a manufacturing process for a riblet structure as defined in the embodiment described with respect to FIG. 3. In step 801 a web tool 812 is created as previously described with respect to FIG. 7C to define spaced protuberances 814 corresponding to the desired riblet dimensions. The tool 812, as shown in FIG. 8, may be a section of a flat tool or a roll tool employed for web processing. For the embodiment shown in FIG. 8, nickel is employed for the rigid tips 302. A complimentary tool 816 is created in step 802 by impression on the web tool 816 which provides grooves 818 corresponding to the riblet shape. Spacing between the grooves provides a substantially flat intermediate surface 820 corresponding to the dimension 118 desired between the riblet tips 302. In certain embodiments, the complimentary tool 816 may be nickel or a silicon web tool as described with respect to FIG. 7C. In step 803 resist 822 is applied to the flat surfaces 820 on the nickel tool and rigid tips 302 are deposited by electro-forming onto the tool in step 804. The resist 822 is then removed in step 806 providing the spaced riblets in the tool. For the embodiment shown the bases 306 are placed into relief extending from the tool 816 by the removal of the resist as shown in step 806. The elastomer layer 304 is then cast over the bases 306 in step 807. In alternative embodiments electroforming of the rigid tips 302 provides a base substantially flush with the flat surface for direct adherence to the elastomer surface 305 as previously described with respect to FIG. 3. For the exemplary process shown with respect to FIG. 8 a preformed appliqué 824 comprising the multilayer structure of aluminum foil as a metallic layer 310, polymer layer 312 and adhesive layer 314 is adhered to the cast elastomer 304 in step 808. A removable adhesive liner 826 for preservation of the adhesive during further processing is shown as a portion of the preformed appliqué. The multilayer structure is then removed from the complimentary tool 816 creating a multilayer riblet array appliqué 829 and exposing the rigid tips 302. Masking 828 is applied over the tips 302 and elastomer 304 to assist in handling during additional processing and as also shown in step 808. The masking 828 in exemplary embodiments may be, without limitation, a solution cast releasable polymer such as silicon or an adhesive film such as Mylar® with a low tack acrylic adhesive applied during roll processing. Alternatively, the complimentary web tool 816 when fabricated from a water/fluid soluble polymer may be employed as masking layer 828 to allow removal of the masking by dissolving with water or other fluid after installation.

The completed multilayer riblet array appliqué 829 may then be applied to an airplane surface 830 by removing the adhesive liner 826 and adhering the adhesive layer 314 to the surface 830 as shown in step 809. The masking 828 is then removed from the tips 302 and elastomer 304.

The rigid materials employed for the tips as described in the embodiments and fabrication processes herein allows very fine tip structure having a dimension 307 of around 15 to 25 microns at the base with a dimension 309 at the extreme end of the tips typically on the order of 100 nanometers (0.1 micron) as shown in FIG. 3. Smaller tips may be obtained with tooling and release process refinement. Even thought the tips are very sharp, the very fine spacing of the tips avoids cuts in normal handling by installation personnel.

Figure 9:
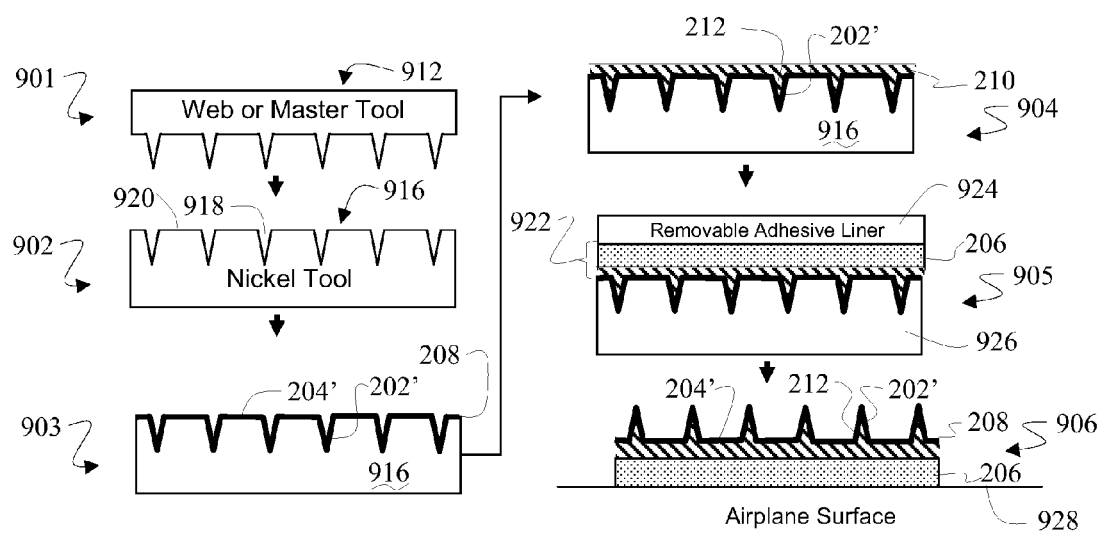
FIG. 9 is a flow diagram of processing steps for an exemplary method of fabrication of rigid tipped riblets of a third embodiment.

FIG. 9 is a flow diagram showing a manufacturing process for a riblet structure as defined in the embodiment described with respect to FIG. 2A. In step 901 a master tool 912 is created. The tool 912, as shown in FIG. 9, may be a section of a flat tool or a roller employed for roll-to-roll web processing. For the embodiment shown in FIG. 9 nickel is employed for the cladding 208 which forms the rigid tips 202' and surface layer 204'. A complimentary tool 916 is created in step 902 by impression on the master tool 912 which provides grooves 918 corresponding to the riblet shape. Spacing between the grooves provides a substantially flat intermediate surface 920 corresponding to the dimension 118 desired between the riblets tips 202'. In step 903 nickel cladding 208 is deposited by electroforming into the complimentary tool 916 to form rigid tips 202' and surface layer 204' in step 903. In alternative embodiments, the cladding may be cast or roll formed into the complimentary tool. In certain embodiments, a release compound is applied to the surfaces on the complimentary tool 916 to assist in removal of the tips 202' and surface layer 204' from the tool 916. Polymer layer 210 is then cast into the cladding 208 to provide both a support layer and light weight cores 212 for the tips in step 904. As previously described the polymer layer 210 may be an elastomer in certain embodiments. Adhesive layer 206 is then applied in step 905 to the polymer layer 210 opposite the rigid tips 202' to create an appliqué 922. A removable adhesive liner 924 for handling of the completed appliqué 922 is added, the appliqué 922 with adhesive liner 924 is removed from the nickel tool 916 and masking 926 is applied over the tips 202' and surface layer 204' for handling as also shown in step 905. Application to the aircraft surface 928 is accomplished as shown in step 906 by removal of the adhesive liner 924 followed by attachment of the adhesive layer 206 of the appliqué 922 to aircraft surface 928. Removal of the masking 926 completes the process.

Figure 10:
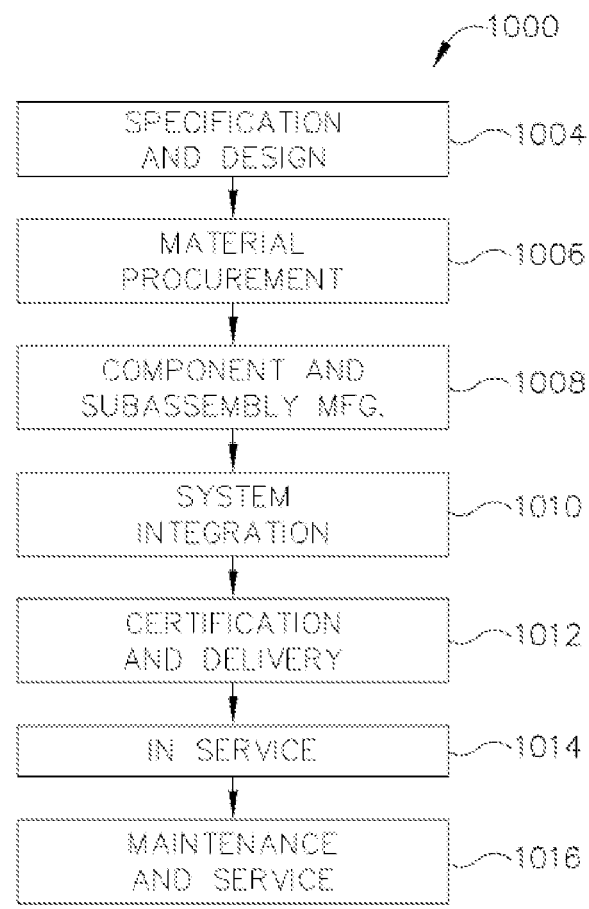
FIG. 10 is a flow diagram describing use of the rigid tipped riblets embodiments disclosed herein in the context of an aircraft manufacturing and service method.
Figure 11:
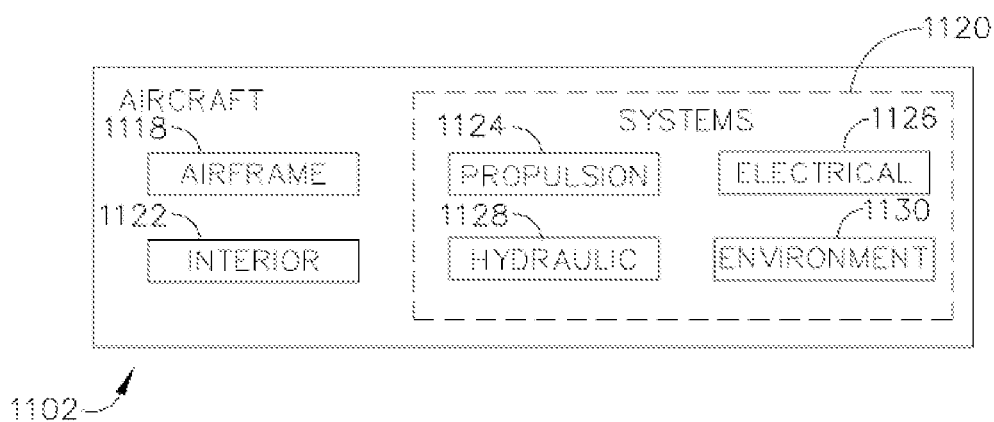
FIG. 11 is a block diagram representing an aircraft employing the rigid tipped riblets with embodiments as disclosed herein.

Referring more particularly to FIGS. 10 and 11, embodiments of the rigid riblets disclosed herein and the methods for their fabrication may be described in the context of an aircraft manufacturing and service method 1000 as shown in FIG. 10 and an aircraft 1102 as shown in FIG. 11. During pre-production, exemplary method 1000 may include specification and design 1004 of the aircraft, which may include the riblets, and material procurement 1006. During production, component and subassembly manufacturing 1008 and system integration 1010 of the aircraft takes place. The riblet appliqués and their manufacturing processes as described herein may be accomplished as a portion of the production, component and subassembly manufacturing step 1008 and/or as a portion of the system integration 1010. Thereafter, the aircraft may go through certification and delivery 1012 in order to be placed in service 1014. While in service by a customer, the aircraft 1002 is scheduled for routine maintenance and service 1016 (which may also include modification, reconfiguration, refurbishment, and so on). The riblet appliqués as described herein may also be fabricated and applied as a portion of routine maintenance and service.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 1102 produced by exemplary method 1000 may include an airframe 1118 having a surface 111, as described with respect to FIG. 1, and a plurality of systems 1120 and an interior 1122. Examples of high-level systems 1120 include one or more of a propulsion systems 1124, an electrical and avionics system 1126, a hydraulic system 1128, and an environmental system 1130. Any number of other systems may be included. The rigid tipped riblets supported by the embodiments disclosed herein may be a portion of the airframe, notably the finishing of skin and exterior surfaces. Although an aerospace example is shown, the principles disclosed by the embodiments herein may be applied to other industries, such as the automotive industry and the marine/ship industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1102 is in service. Also, one or more apparatus embodiments, method embodiments, or a combination thereof may be utilized during the production stages 1008 and 1010, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1016.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:
1. A multilayer construction for riblets comprising:
   a first layer including a polymer and a plurality of individual rigid lips formed from material selected from the set of nickel, chromium, metal alloy, glass, ceramic, silicon carbide and silicon nitride providing durability, said rigid tips extending longitudinally parallel to a flow direction, a separate base expanding from each of the individual rigid tips, said base of each of the individual rigid tips laterally separated and supported in a predetermined spaced relation and surrounded by the polymer, the individual rigid tips protruding from the polymer forming substantially parallel aerodynamic riblets extending from the polymer; and, a second layer composed of a material exhibiting capability for adherence to a surface.

2. The multilayer construction for riblets as defined in claim 1 wherein the first layer includes a polymer surface layer continuously cast with the tips.

3. The multilayer construction for riblets as defined in claim 2 wherein a polymer layer is deposited on the polymer surface layer opposite the tips.

4. The multilayer construction for riblets as defined in claim 3 further comprising an adhesive layer deposited on the polymer layer to form a multilayer appliqué, said adhesive layer adhering the appliqué to a surface.

5. The multilayer construction for riblets as defined in claim 1 wherein the polymer is an elastomeric layer surrounding the base of each of the rigid tips.

6. The multilayer construction for riblets as defined in claim 5 wherein in the base protruding from each rigid tips is surrounded by elastomer in the elastomeric layer and the second layer comprises an adhesive layer deposited on the elastomeric layer, said adhesive layer adhering to a surface.

7. The multilayer construction for riblets as defined in claim 1 wherein each rigid tip is longitudinally segmented to provide gaps.

8. An aircraft aerodynamic riblet structure comprising:

an array of riblets having a plurality of rigid tips formed from material selected from the set of nickel, chromium, metal alloy, glass, ceramic, silicon carbide and silicon nitride and segmented longitudinally at predetermined locations;

an elastomeric layer surrounding bases extending from the rigid tips, said bases laterally separated from adjacent bases;

a polymer layer deposited on the elastomeric layer opposite the tips;

an adhesive layer deposited on the polymer layer to form a multilayer appliqué;

said adhesive layer adhering to a surface of an aircraft.

* * * * *